(12) United States Patent
Kruger et al.

(10) Patent No.: US 8,869,246 B2
(45) Date of Patent: *Oct. 21, 2014

(54) MASK BASED CHALLENGE RESPONSE TEST

(75) Inventors: Stephen Paul Kruger, Dublin (IE);
Olgierd Stanislaw Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/426,101

(22) Filed: Mar. 21, 2012

(65) Prior Publication Data

US 2012/0192266 A1    Jul. 26, 2012

Related U.S. Application Data

(63) Continuation of application No. 13/155,654, filed on Jun. 8, 2011.

(30) Foreign Application Priority Data

Jun. 28, 2010 (EP) .................................. 10167535

(51) Int. Cl.
*G06F 21/00* (2013.01)
*G06F 21/31* (2013.01)
*H04L 9/32* (2006.01)

(52) U.S. Cl.
CPC ........ *G06F 21/31* (2013.01); *G06F 2221/2103* (2013.01); *G06F 2221/2133* (2013.01); *H04L 9/3271* (2013.01)
USPC .................................................. 726/4; 726/5

(58) Field of Classification Search
CPC . G06F 21/36; G06F 2221/2133; G06F 21/31; H04L 63/08; H04L 9/3271; H04W 12/06
USPC .......................................................... 726/4, 5
See application file for complete search history.

(56) References Cited

U.S. PATENT DOCUMENTS

| | | | |
|---|---|---|---|
| 7,891,005 B1 * | 2/2011 | Baluja et al. | 726/26 |
| 8,209,743 B1 * | 6/2012 | Frank | 726/2 |
| 2008/0127302 A1 * | 5/2008 | Qvarfordt et al. | 726/2 |
| 2008/0216163 A1 * | 9/2008 | Pratte et al. | 726/7 |

(Continued)

OTHER PUBLICATIONS

Yamamoto et al., "CAPTCHA Using Strangeness in Machine Translation", IEEE conference on advance information networking and applications Apr. 2010, pp. 430-437, http://ieeexplore.ieee.org/xpls/abs_all.jsp?arnumber=5474731 &tag=1.*

(Continued)

*Primary Examiner* — Jung Kim
*Assistant Examiner* — Carlos M De Jesus Lassaia
(74) *Attorney, Agent, or Firm* — Steven L. Nichols; Van Cott, Bagley, Cornwall & McCarthy P.C.

(57) ABSTRACT

A method for providing a challenge response test associated with a computer resource performed by a physical computing system includes, with the physical computing system, generating a challenge response test image comprising a plurality of well-formed construct elements forming a well-formed construct and a plurality of random construct elements, and providing a number of masks to be placed over the image, one of the number of masks configured to reveal the well-formed construct elements when placed over the image.

9 Claims, 10 Drawing Sheets

(56) References Cited

U.S. PATENT DOCUMENTS

| | | | |
|---|---|---|---|
| 2009/0094687 A1* | 4/2009 | Jastrebski et al. | 726/6 |
| 2009/0113294 A1* | 4/2009 | Sanghavi et al. | 715/269 |
| 2009/0138723 A1* | 5/2009 | Nyang et al. | 713/182 |
| 2009/0232351 A1* | 9/2009 | Kagitani et al. | 382/100 |
| 2009/0235327 A1* | 9/2009 | Jakobsson et al. | 726/2 |
| 2011/0081640 A1* | 4/2011 | Tseng et al. | 434/362 |
| 2011/0208716 A1* | 8/2011 | Liu et al. | 707/710 |

OTHER PUBLICATIONS

John, "Top 10 Worst Captchas", IT Management and Cloud Blog, Mar. 2008, pp. 1-24 http://www.johnmwillis.com/other/top-IO-worst-captchas/.*

* cited by examiner

MASK BASED CHALLENGE RESPONSE TEST

RELATED APPLICATION

The present application is a continuation of, and claims priority under 35 U.S.C. §120 from, U.S. application Ser. No. 13/155,654, filed Jun. 8, 2011, entitled "MASK BASED CHALLENGE RESPONSE TEST," which is incorporated herein by reference in its entirety. In turn, U.S. application Ser. No. 13/155,654 claims priority under 35 U.S.C. §119(a) from European Patent Application Serial No. 10167535.3, filed on Jun. 28, 2010 the entire disclosure of which is incorporated herein by reference.

BACKGROUND

Aspects of the present invention relate in general to Internet security, and more particularly, to challenge response tests. A challenge response test such as a CAPTCHA ("Completely Automated Public Turing test to tell Computers and Humans Apart") is method of determining whether a respondent to an inquiry is a human user or an automated computing device. Such tests are designed so that a human user will easily be able to pass the test while a computer will have difficulty passing the test. This is because the test requires certain cognitive abilities that computers do not have. Thus, if the test is passed, it can be assumed that the respondent is in fact human rather than machine.

CAPTCHA tests are often used when a user wishes to access an internet resource such as a database on an internet server. As the user attempts to access the database, the user is presented with the challenge response test. If the user passes the test, access to the database is allowed. However, if the user fails the test, access to the database is denied. Such tests are used to deter automated attack requests on a variety of web services. For example, an email service provider does not want someone to create a program to automatically create several email accounts which will likely be used for spamming purposes.

If a computer can respond correctly to a challenge response test, then the computer can access the protected computer resource. Some challenge response tests are fallible because malicious persons may be able to create cracking algorithms for specific challenge response tests. Thus, in order to create an effective challenge response test, it must be so difficult that the cost of creating a cracking algorithm prohibitively high.

BRIEF SUMMARY

A method for providing a challenge response test associated with a computer resource performed by a physical computing system includes, with the physical computing system, generating a challenge response test image comprising a plurality of well-formed construct elements forming a well-formed construct and a plurality of random construct elements, and providing a number of masks to be placed over the image, one of the number of masks configured to reveal the well-formed construct elements when placed over the image.

A computing system includes a processor and a memory communicatively coupled to the processor. The processor is configured to generate a challenge response test image that includes a plurality of well-formed construct elements forming a well-formed construct and a plurality of random construct elements, and provide a plurality of masks to be placed over the image, one of the number of masks configured to reveal the well-formed construct elements when placed over the image.

A computer program product for providing a challenge response test includes a computer readable storage medium having computer readable code embodied therewith. The computer readable program code includes computer readable program code configured to generate a challenge response test image that includes a plurality of well-formed construct elements forming a well-formed construct and a plurality of random construct elements, and computer readable program code configured to provide a plurality of masks to be placed over the image, one of the number of masks configured to reveal the well-formed construct elements when placed over the image.

A method for providing a challenge response test performed by a physical computing system includes, with the physical computing system, generating a challenge response test image comprising a framework of multiple cells, the cells to hold a plurality of well-formed construct elements forming a well-formed construct and a plurality of random construct elements, providing a number of masks to be placed over the image, one of the number of masks configured to reveal the well-formed construct elements when placed over the image, prompting a user, granting the user access to a resource in response to receiving a response from the user that matches the well-formed construct.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, if a computer can respond correctly to a challenge response test, then the computer can access the protected computer resource. Some challenge response tests are fallible because malicious persons may be able to create cracking algorithms for specific challenge response tests. For example, one type of challenge response test may be to provide an image with distorted letters to spell a word. These letters are distorted enough so as to be unrecognizable by standard character recognition algorithms while at the same time being recognizable by human users. However, cracking algorithms can be developed that are better able to recognize such distorted letters. Thus, in order to create an effective challenge response test, it must be so difficult that the cost of creating a cracking algorithm prohibitively high.

In light of this and other issues, the present specification discloses methods and systems for providing an efficient challenge response test. According to certain illustrative examples, the computing system that presents a user with a challenge response test generates a well-formed construct that includes several well-formed construct elements. In one example, the well formed construct is a grammatically correct sentence and the elements of that construct are the words of that sentence. The well formed construct elements are placed into an image along with a number of random construct elements such as random words.

A number of masks are created such that they will block several of the elements within the image while revealing some of the elements within the image. Some of the generated masks will reveal the random elements. However, one of the masks will reveal only the elements that form the well-formed construct. When presented with the challenge response test, a human user may select from among the many masks to see if any of them will reveal a well-formed construct. When the user discovers a recognizable well-formed construct through application of the correct mask, then the user can provide the appropriate response to the challenge response test.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
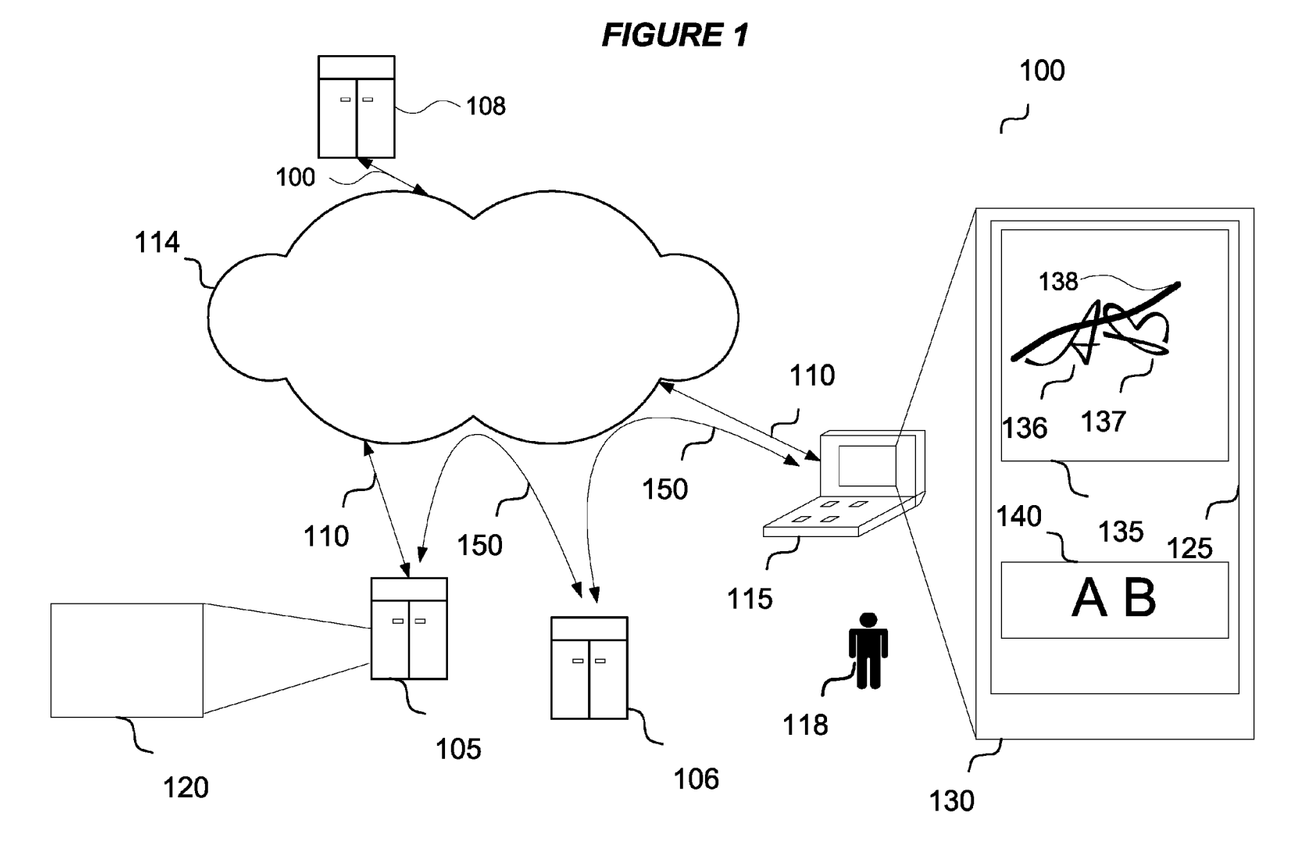
FIG. 1 is a block diagram showing an illustrative network of computer systems, according to one example of principles described herein.

Referring now to the figures, FIG. 1 is a block diagram showing an illustrative computer system (100). The computer system (100) includes a number of computer devices including a first server (105), second server (106), a third server (108), and workstation (115) connectable through a network (114). The network may comprise either a wired or a wireless structure (110). An example of a network (114) is the Internet. A user (118) uses the workstation (115) to access a server resource (120) available on the first server (105). The workstation (115) may be one of several types of computing devices including a desktop computer, a laptop computer, a tablet computer, or a mobile smart phone.

When the user (118) enters a uniform resource locator (URL) address of a webpage (125), a request is sent to the first server (105), which presents a CAPTCHA image (135). The image (135) is displayed in a window (130) of the workstation (115). The webpage (125) is typically a hypertext markup text language (html) rendering of a server webpage (120) on the first server (105). The CAPTCHA may also be available to the third server (108), if the third server (108) attempts an automatic access to the webpage (120). Alternatively, a second server (106) is used by the first server (105) as an authentication server (106). The authentication server (106) authenticates requests to access the server resource (120) using the network path (150) to that server.

The CAPTCHA image (135) includes the two distorted characters 'A' (136) and 'B' (137). The distortion comprises a rotation of the B character (137), and a line (138). The user (118) would responds to such a challenge response test by typing the characters "A B" into an input box (140). However, as mentioned above, such tests may be prone to cracking algorithms.

Figure 2:
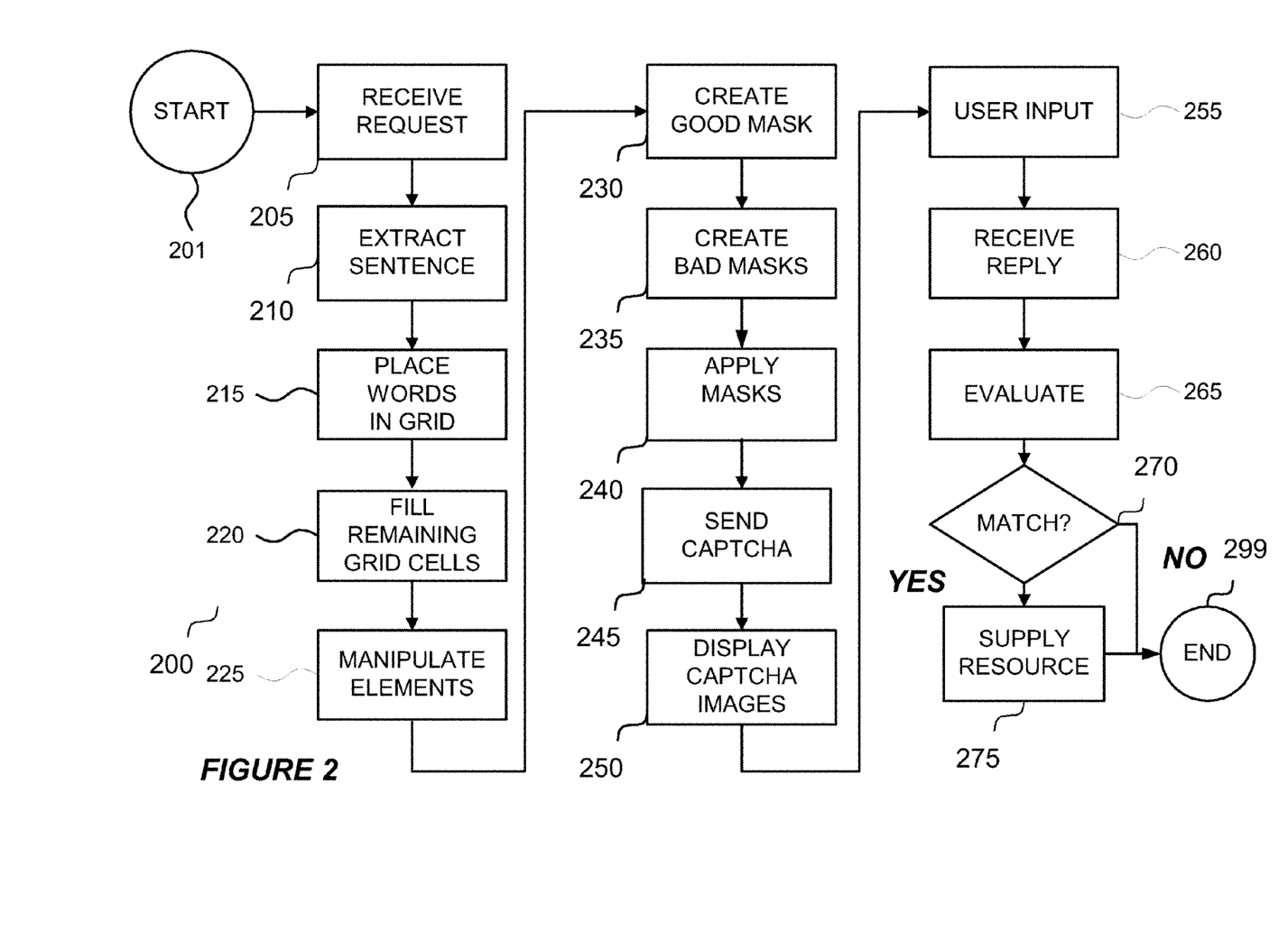
FIG. 2 is flow diagram showing an illustrative method for providing a challenge response test that is provided in response to an attempt to access a computer resource, according to one example of principles described herein.
Figure 3:
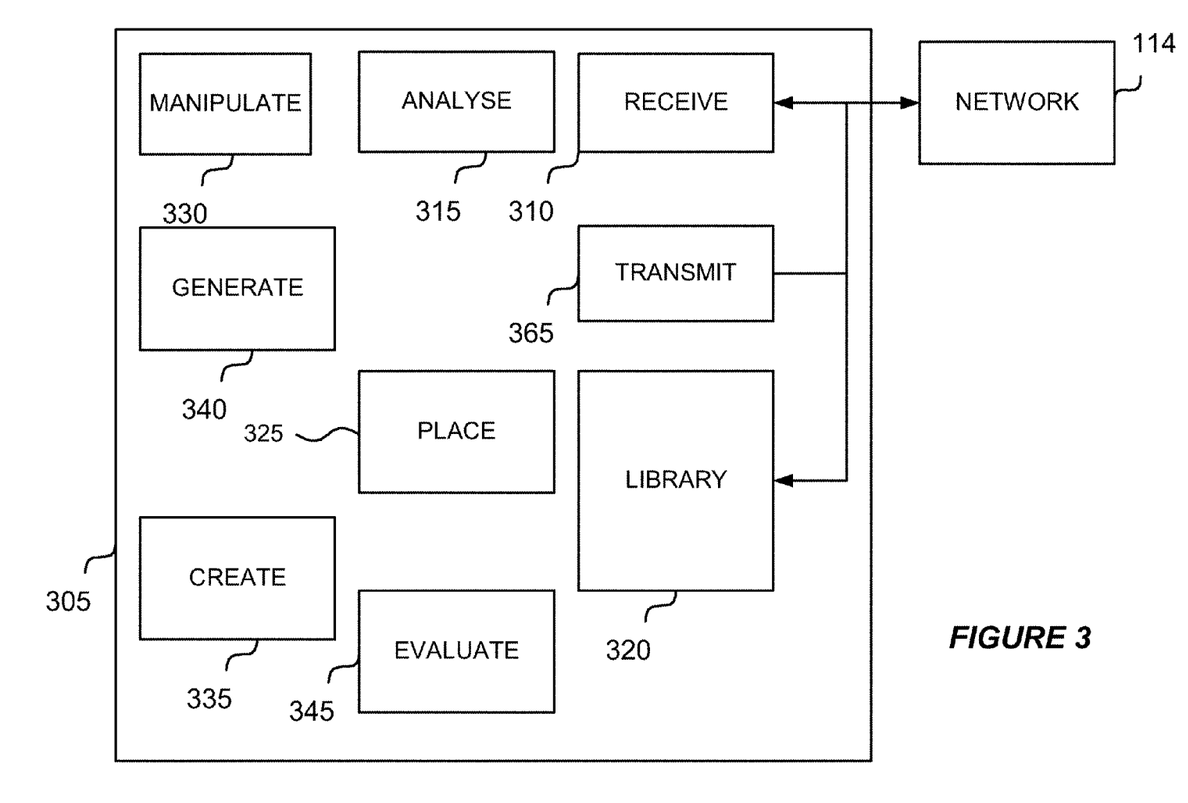
FIG. 3 is a block diagram showing an illustrative computer system for providing a challenge response test, according to one example of principles described herein.
Figure 4:
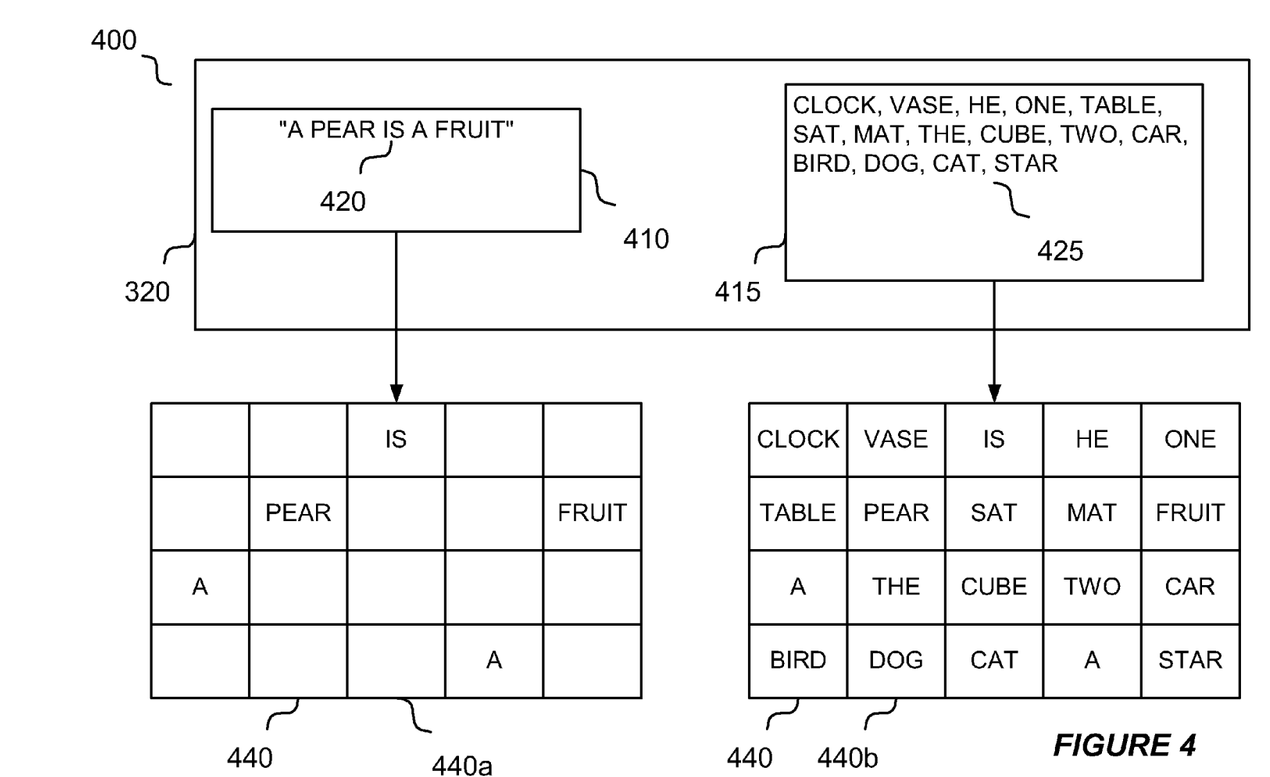
FIG. 4 is a diagram showing illustrative construct elements that form an image, according to one example of principles described herein.
Figure 5:
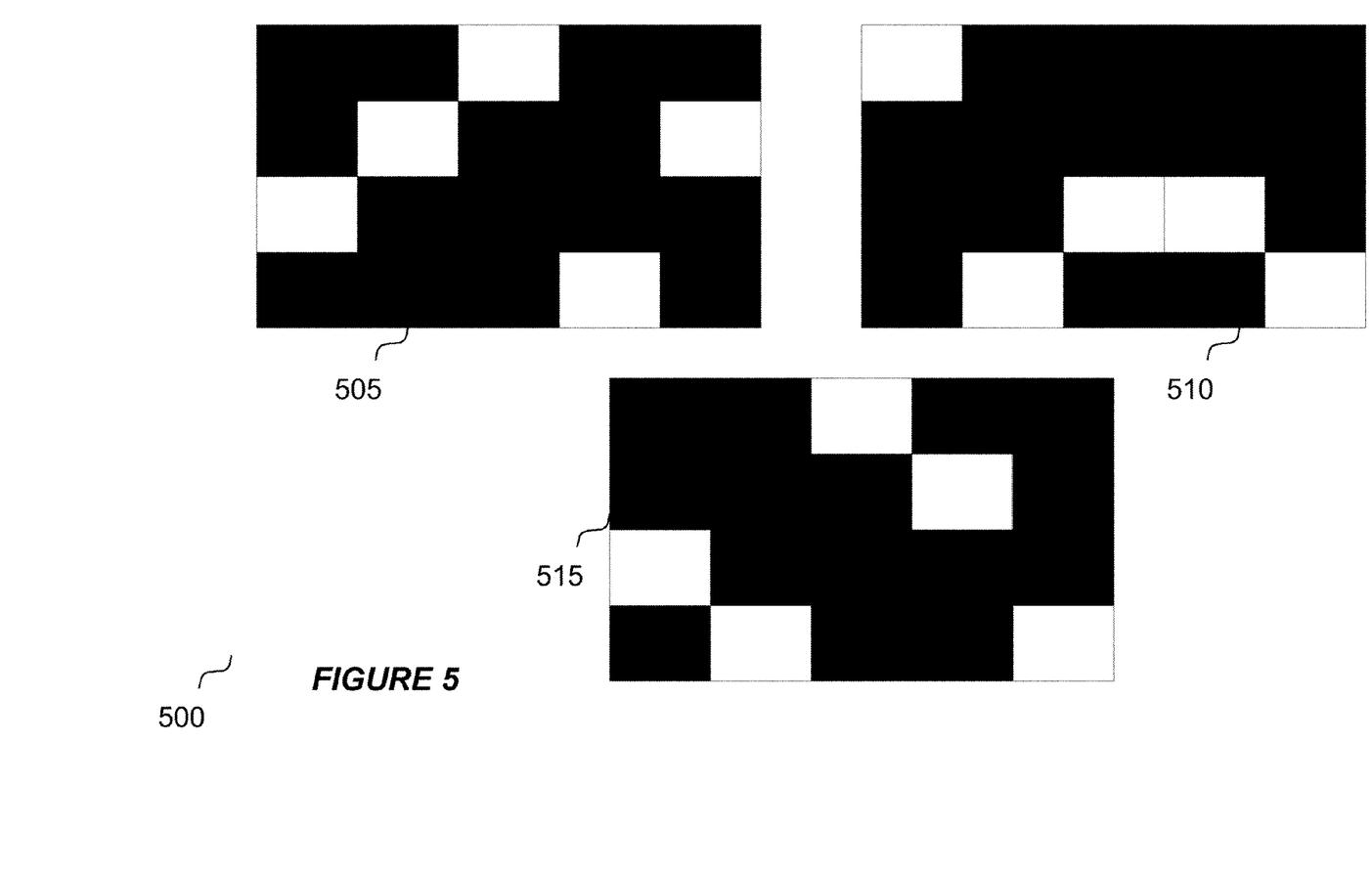
FIG. 5 is a diagram showing a number of illustrative masks, according to one example of principles described herein.
Figure 6:
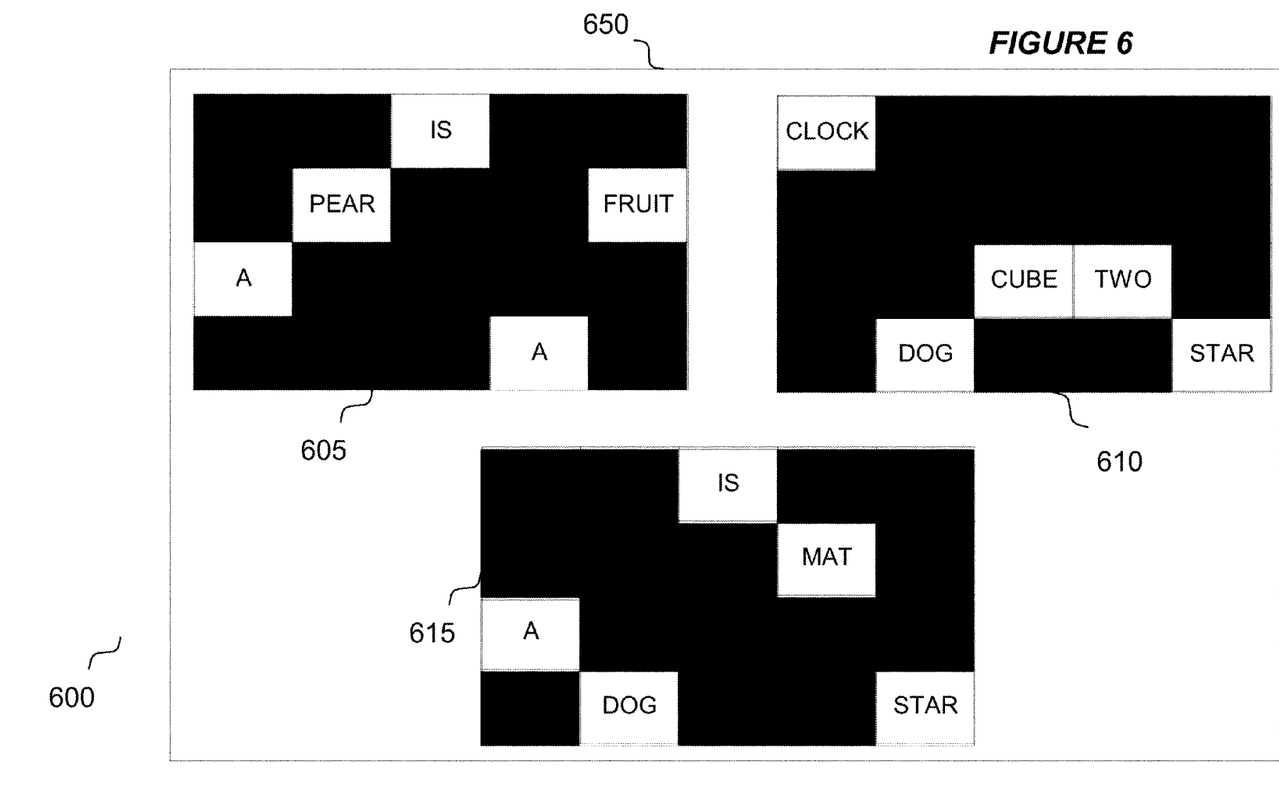
FIG. 6 is a diagram showing an illustrative placement of the masks over the image that includes the construct elements, according to one example of principles described herein.

FIG. 2 is a flowchart showing an illustrative method for providing a challenge response test. Such a challenge response test may be used to protect access to an internet resource. The description of the method illustrated in FIG. 2 will reference the subsequent figures. FIG. 3 is a block diagram (300) showing an illustrative computer system for providing a challenge response test. FIG. 4 is a diagram (400) showing illustrative construct elements that form an image. FIG. 5 is a diagram (500) showing a number of illustrative masks. FIG. 6 is a diagram (600) showing an illustrative placement of the masks over the image that includes the construct elements, according to one example of principles described herein. The process described in FIG. 2 is merely one example of how a process embodying principles described herein may be implemented.

The method starts at step 201. A user (118) enters a uniform resource locator (URL) address of a webpage (120), and sends that URL request to the first server (105). The first server (105) then receives (step 205) the URL request and determines that the URL request is for a resource (120) that requires access to be authenticated through the challenge response test. The first server (105) then sends a CAPTCHA request associated with the resource (120) to the computing device (305) that provides the challenge response test. The components of this computing device are shown in FIG. 3. A receive module (310) of the computing device (305) receives the CAPTCHA request.

At step 210 an analyze module (315) analyzes the CAPTCHA request to determine an identifier for the resource (120). The analyze module (310) extracts a well-formed construct such as a grammatically correct sentence (420) from a data source such as a sentence library (320). FIG. 4 provides an example of the well-formed construct as the sentence "A PEAR IS A FRUIT". This sentence is complete and grammatically correct both in syntax and semantic meaning The source sentence (420) is made up of individual words which are referred to as well-formed construct elements. Alternatively, any common phrase or idiom may be used for the source sentence (420).

At step 215, a place module (325) places each of the construct elements into a framework (440). The framework includes a set of cells. One type of framework that may be used is a two dimensional grid such as the 5×4 grid depicted in FIG. 4. In one example, the place module (325) places each of the words in a different cell in an order that is well-formed for the grammar, using different rows and columns to provide a semi-filled framework (440, 440a).

At step 220, the analyze component (315) extracts a further set of random construct elements (425) from a data source such as the library (320). The place module (325) places each of the random words (425) into the cells of the framework that do not already contain one of the words from the source sentence (420). This creates a fully filled framework (440, 440b).

At step 225, a manipulate module (330) manipulates the contents of the framework (440, 440b) by distorting them in ways that make them more difficult for a computer to recognize. For example, the words may be blurred, rotated, or have lines placed through them.

At step 230, a create module (335) creates a good mask (505). A good mask (505) is designed to block out the random construct elements (425) and reveal only the well-formed construct elements. Specifically, when the good mask (505) is placed over the framework, only the cells that include the well-formed construct elements are visible. The remaining random construct elements are blocked. Additionally, the create module (335) creates at least one bad mask (510, 515). A bad mask (510, 515) is designed to reveal a set of construct elements that do not form the source sentence (420). Specifically, the bad mask (510, 515) will reveal some random elements instead of only the proper elements that form the source sentence (420).

At step 240, a generate module (340) applies the good mask (505) to the filled framework (440b) to generate a substantially well-formed construct (605). The substantially well-formed construct represents the source sentence (420). The generate module (340) also applies each of the bad masks (510, 515) to generate a set of ill-formed constructs (610, 615). The generate module (340) collates the substantially well-formed construct (605), and each of the ill-formed constructs (610, 615) to produce a challenge response test image (CAPTCHA image) (650).

At step (245), a transmit module (365) transmits the constructs of the produced CAPTCHA image (650) to the workstation (115). At step 250, the transmitted CAPTCHA image (650) is displayed in a window (130) of the workstation (115). The CAPTCHA challenges the user (118) to identify the well-formed construct representing the sentence "A PEAR IS A FRUIT", from the constructs of the CAPTCHA image (650).

The user (118) selects one of the constructs (605, 610, 615) as the substantially well-formed construct (605), and the workstation (115) sends a reply message to the computing device (305). At step 260, the receive module (310) receives the reply message. At step 265, an evaluate module (345) evaluates whether the reply message matches a value associated with the CAPTCHA image (650). The value indicates that the user (118) correctly identified the well-formed construct (605). If the user (118) is correct, at step 275, the computing device (305) transmits an authentication message to the server (105). The server (105) then supplies the resource (120) to the workstation (115) of the user (118). The method ends at step 299.

Various sentences from various sources may be used to make it more difficult for a cracking algorithm to be developed. Furthermore, the random words used may be common words so that if an internet search is made from those words, several results will be displayed so as to overwhelm any cracking algorithm.

Figure 7:
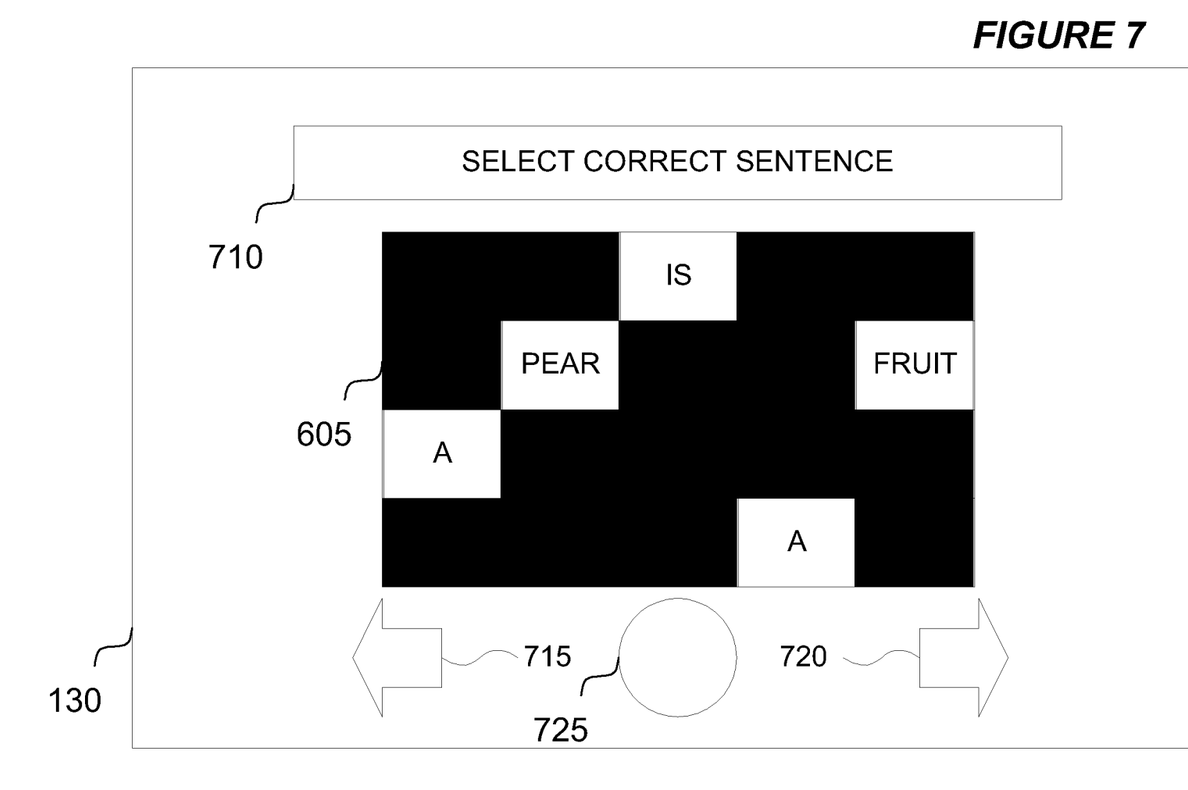
FIG. 7 is a diagram showing an illustrative user interface for interchanging the masks placed over the image that includes the construct elements, according to one example of principles described herein.

FIG. 7 is a diagram showing an illustrative user interface for presentation of the constructs (605, 610, 615) of the CAPTCHA image (650) to the user (118). According to certain illustrative examples, the user (118) is presented with instructions 710, left and right arrows 715 to review each of the constructs of the CAPTCHA image (650), and a select button (725) to select one of the constructs (605, 610, 615). By clicking on one of the arrows (715), one of the constructs (605, 610, 615) is displayed. In an alternative embodiment, the constructs of the CAPTCHA image (650) are all shown together.

Figure 8:
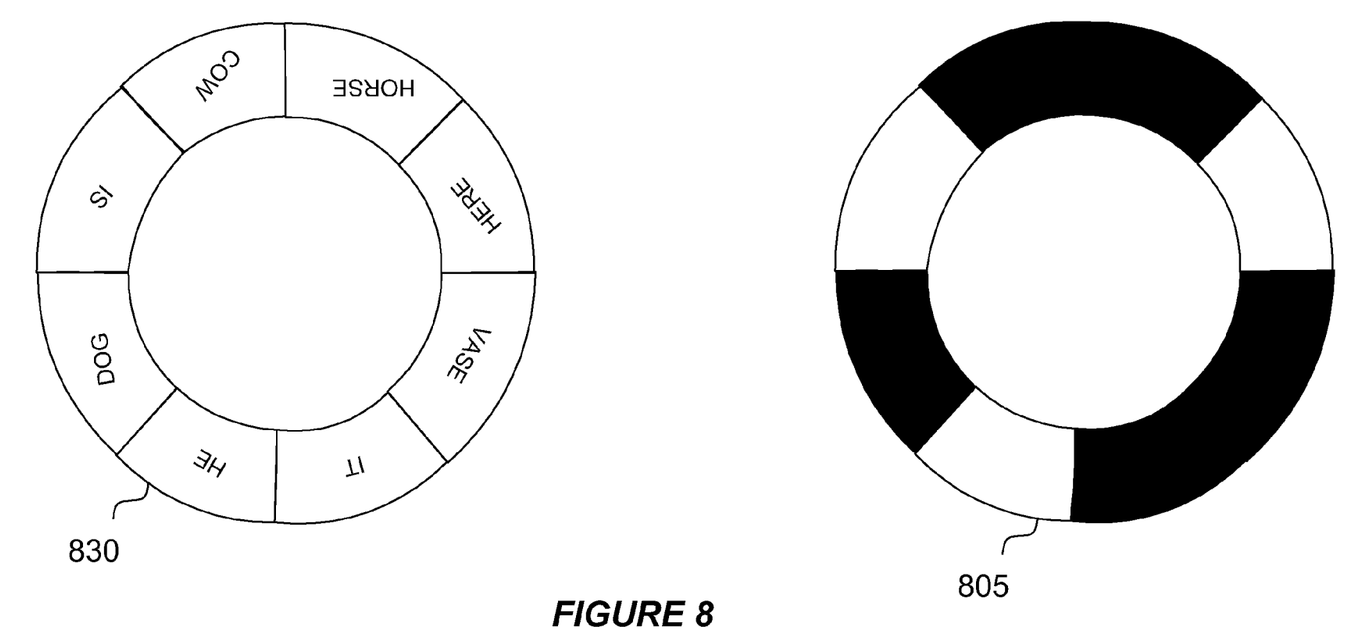
FIG. 8 is a diagram showing an illustrative wheel framework for construct elements and an associated mask, according to one example of principles described herein.
Figure 9:
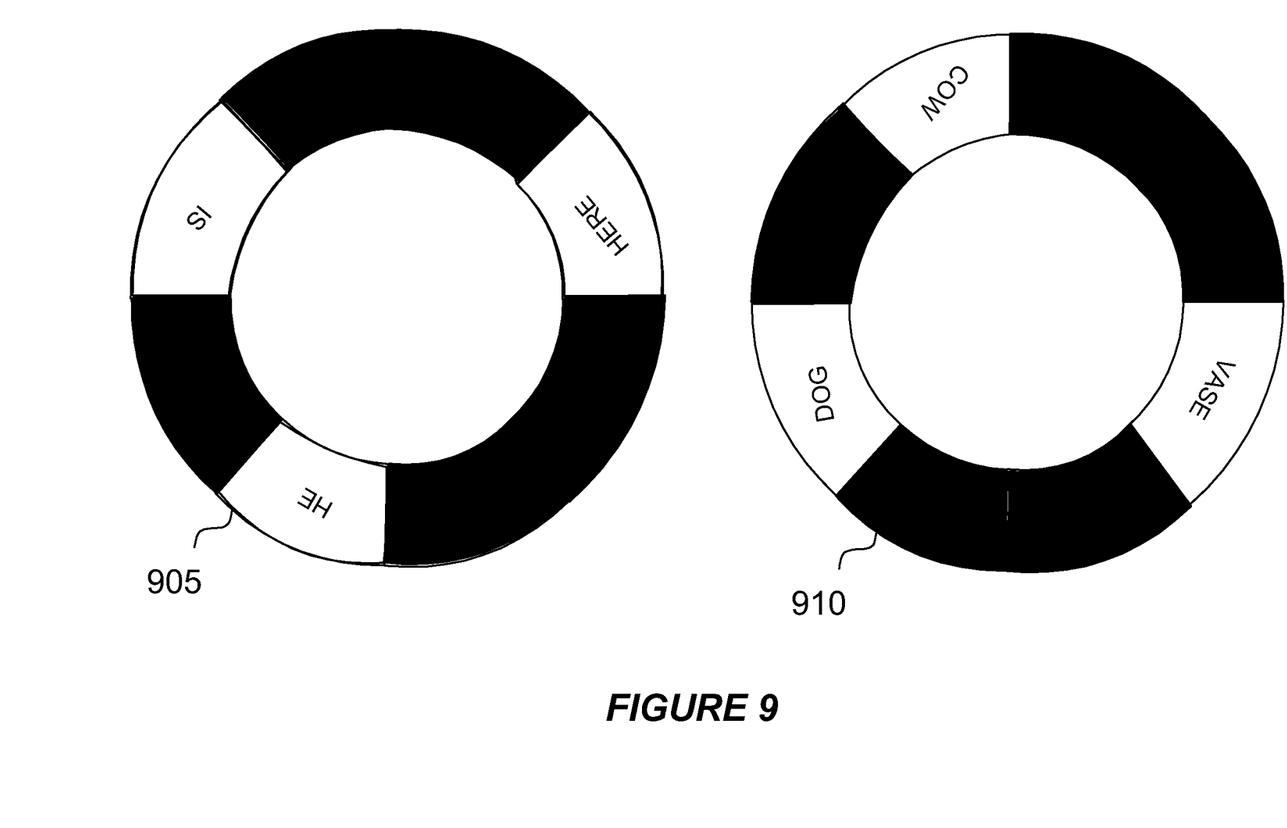
FIG. 9 is a diagram showing an illustrative placement of wheel masks over a wheel framework of construct elements, according to one example of principles described herein.

FIGS. 8 and 9 are diagrams showing an illustrative wheel framework and associated masks. The framework (830) is filled with the well-formed construct elements as well as random elements. The good mask (805) is designed so that it reveals only the words that form the source sentence. In this case, the sentence is "HE IS HERE". The framework also includes the random words, "DOG", "COW", "HORSE", "VASE", and "IT". Instead of selecting different masks for a good mask and for the set of bad masks, the good mask 805 is used in the generation of both the substantially well-formed construct, and each of the ill-formed constructs.

FIG. 9 depicts a substantially well-formed construct 905, as a result of the generate module (340) applying the good mask (805) to the filled framework (830). FIG. 9 also depicts an ill-formed construct (910) as a result of the application of the good mask 805 that has been rotated clockwise by one cell. Rotating the good mask (805) is thus essentially the same as providing a bad mask.

Figure 10:
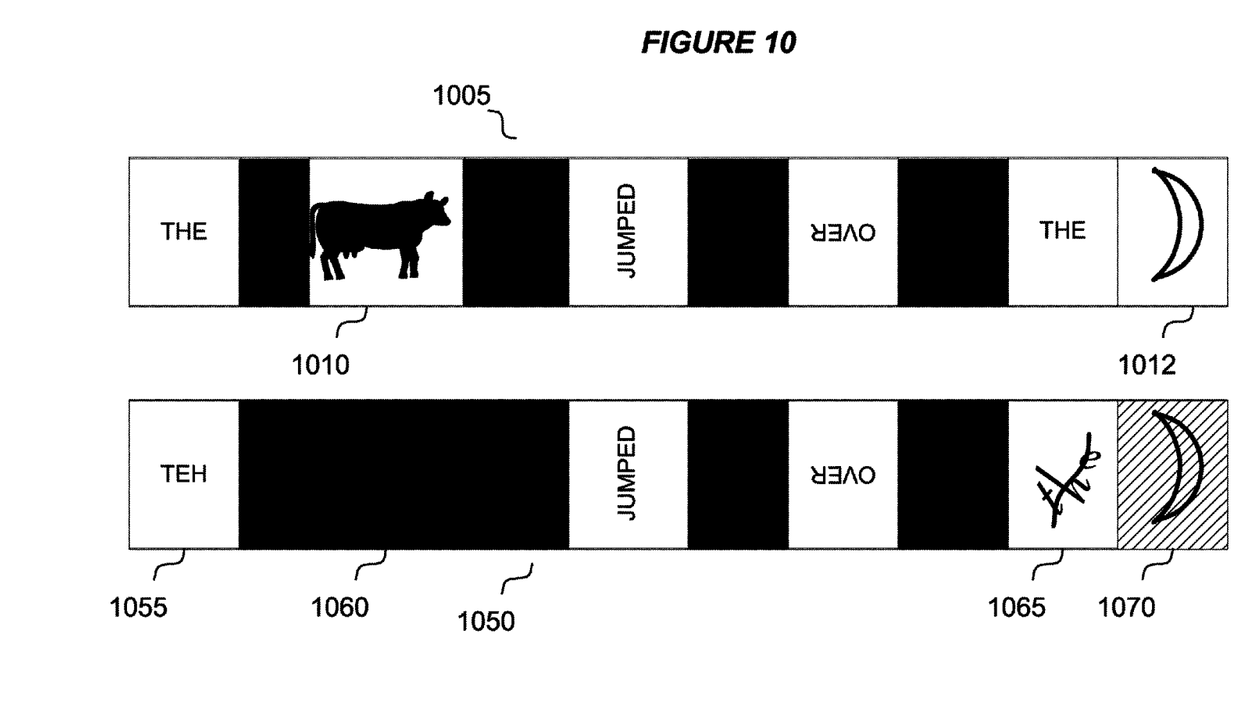
FIG. 10 is a diagram showing an illustrative one dimensional framework of construct elements where further methods of obfuscation are used, according to one example of principles described herein.

FIG. 10 is a diagram (1005) showing an illustrative one dimensional framework of construct elements where further methods of obfuscation are used. According to certain illustrative examples, text transformations such as rotation, different fonts, different styles, and different colors can be used to increase the difficulty of automatically cracking the CAPTCHA without increasing the difficulty of solving the CAPTCHA for human users. The sentence comprises multiple elements, and therefore each element can be manipulated in a different way. Such manipulation makes automated cracking of the CAPTCHA even harder. This is because a cracking algorithm would have to include multiple methods for each of the manipulated elements. Additionally a graphical representation of some words may replace those words within the sentence. For example, the word "COW" may be replaced with an image of a cow. These types of improvement significantly increase the difficulty of automated cracking because automation would then not only need to find a semantically correct sentence, but would also have to map images into textual representation. However, such a manipulation does not make the CAPTCHA significantly harder for human users to solve.

As an example, FIG. 10 depicts the common sentence of "THE COW JUMPED OVER THE MOON". The phrase has both syntactic and semantic meaning in the English grammar. In this example, the words are placed into a 10×1 grid of elements. The words of the sentence are then placed into the grid along with a number of random words which will be hidden by the appropriate good mask. The manipulate module 330 manipulates the words of the grid. The word "COW" and the word "MOON" are replaced by images of a cow and a moon respectively in cells 1010, 1012. The words "JUMPED" and "OVER" are rotated. The CAPTCHA challenges the user (118) to identify a resulting phrase by identifying a phrase "THE COW JUMPED OVER THE MOON" from an interpretation of the displayed images, followed by identification that the phrase is a substantially well-formed construct, from amongst a set of presented ill-formed constructs (not shown).

Additionally or alternatively, the manipulate module 330 manipulates the words of the grid. The word "THE" in cell 1055 is replaced by a metathetical spelling of "TEH". The word "THE" in cell 1065 is replaced by a distortion of its letters. The word "MOON" is replaced by an images of a moon in cell (1070) and a background image is added. In addition, a good mask, when applied to the filled framework by the generate component 340, covers up the word "COW". The CAPTCHA challenges the user (118) to identify a resulting phrase by identifying a phrase "THE JUMPED OVER THE MOON" from an interpretation of the displayed images, followed by identification that the identified phrase is substantially the same as the well-known phrase "THE COW JUMPED OVER THE MOON", but with the word "COW" missing, from amongst a set of presented ill-formed constructs (not shown). Most human users will be able to insert the word "COW" on their own.

Variations of the above described examples may be used. For example, different size grids may be used. Different types of frameworks may be used. Various constraints may be placed on the placement of elements within the framework so that the words of a sentence substantially read from left to right.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for providing a challenge response test associated with a computer resource and performed by a physical computing system, the method comprising:
   with said physical computing system, generating a challenge response test image comprising a plurality of well-formed construct elements forming a well-formed construct and a plurality of random construct elements; and
   with said physical computing system, providing a number of masks to be placed over said image, one of said number of masks configured to reveal said well-formed construct elements when placed over said image;
   in which said well-formed construct elements comprise words or images of a properly formed sentence and said well-formed construct comprises said sentence.

2. The method of claim 1, further comprising, interchanging said masks placed above said image under direction from a human user.

3. The method of claim 1, further comprising:
   receiving an input construct as an input from a human user; and
   determining that said human user has passed said challenge response test if said input construct matches said well-formed construct.

4. The method of claim 1, wherein said image comprises a framework, said well-formed construct elements and said random construct elements being placed into segments of said framework.

5. The method of claim 4, wherein said framework comprises at least one of: a two dimensional grid of cells, a one dimensional grid of cells, and a wheel of cells.

6. The method of claim 4, wherein said one of said masks revealing said plurality of well-formed construct elements is configured to reveal segments of said framework holding said plurality of well-formed construct elements.

7. The method of claim 1, wherein said random construct elements comprising a non-properly formed sentence.

8. The method of claim 1, wherein said well-formed construct elements are obfuscated through use of: image replacement, metathesis, and rotation.

9. A method for providing a challenge response test associated with a computer resource and performed by a physical computing system, the method comprising:
   with said physical computing system, generating a challenge response test image comprising a framework of multiple cells, said cells to hold a plurality of well-formed construct elements forming a well-formed construct and a plurality of random construct elements;
   with said physical computing system, providing a number of masks to be placed over said image, one of said number of masks configured to reveal said well-formed construct elements when placed over said image;
   with said physical computing system, prompting a user; and
   with said physical computing system, granting said user access to a resource in response to receiving a response from said user that matches said well-formed construct;
   in which said well-formed construct elements comprise words or images of a properly formed sentence and said well-formed construct comprises said sentence.

* * * * *